(12) United States Patent
Albrecht et al.

(10) Patent No.: US 6,921,190 B2
(45) Date of Patent: Jul. 26, 2005

(54) INJECTOR WITH IMPROVED SMALL SHOT METERING

(75) Inventors: Loren Albrecht, Sheboygan, WI (US); John J. Hahn, Hartford, WI (US)

(73) Assignee: MGS Mfg. Group Inc., Germantown, WI (US)

(*) Notice: Subject to any disclaimer, the term of this patent is extended or adjusted under 35 U.S.C. 154(b) by 128 days.

(21) Appl. No.: 10/421,007

(22) Filed: Apr. 22, 2003

(65) Prior Publication Data

US 2004/0213076 A1 Oct. 28, 2004

(51) Int. Cl.[7] .................... B29B 7/42; B29C 45/54
(52) U.S. Cl. ........................ 366/78; 425/587
(58) Field of Search .............. 366/78–79; 425/586–587, 425/583, 559

(56) References Cited

U.S. PATENT DOCUMENTS

| | | | | |
|---|---|---|---|---|
| 3,438,393 A | * | 4/1969 | Godley | |
| 3,590,439 A | * | 7/1971 | Swanson | |
| 3,698,694 A | * | 10/1972 | Zeug et al. | |
| 3,710,988 A | * | 1/1973 | Moslo | |
| 3,985,349 A | * | 10/1976 | Ritzie | |
| 4,330,214 A | * | 5/1982 | Willert | |
| 4,472,058 A | * | 9/1984 | Pirro | |
| 4,512,733 A | * | 4/1985 | Eichlseder et al. | |
| 5,098,267 A | * | 3/1992 | Cheng | |
| 5,439,633 A | * | 8/1995 | Durina et al. | |
| 6,499,987 B1 | * | 12/2002 | Durina et al. | |

FOREIGN PATENT DOCUMENTS

| | | | |
|---|---|---|---|
| JP | 63-260414 | * | 10/1988 |
| JP | 2-34318 | * | 2/1990 |
| JP | 2-62219 | * | 3/1990 |

* cited by examiner

*Primary Examiner*—Charles E. Cooley
(74) *Attorney, Agent, or Firm*—Quarles & Brady LLP

(57) ABSTRACT

An injection screw and barrel for small injection molding shots employs separate plunger and flight sections so that the plunger section may be arbitrarily reduced in diameter without adversely affecting the threaded portion of the flight section. Melt passes from the flight section to a metering area through a hollow bore in the plunger section.

15 Claims, 1 Drawing Sheet

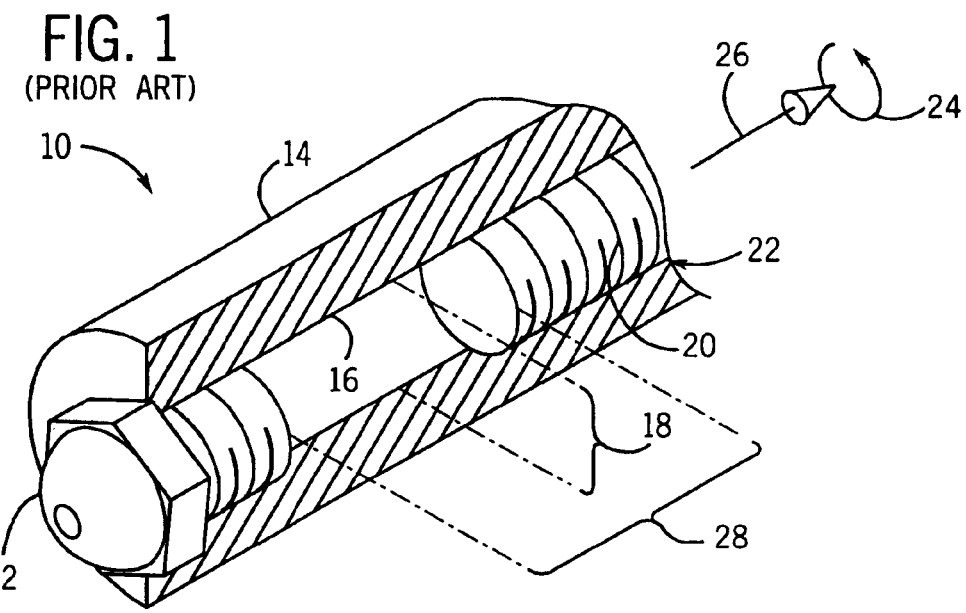
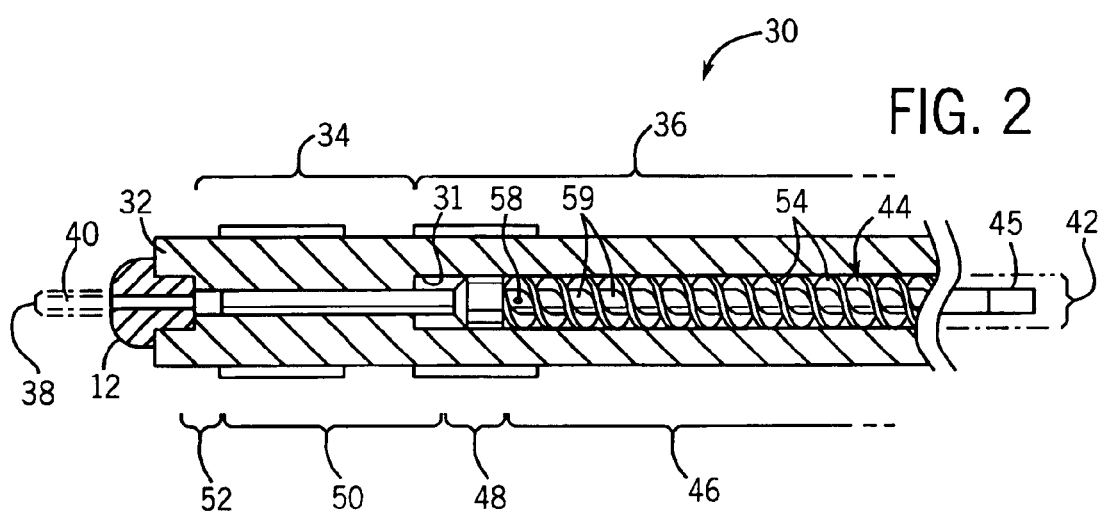
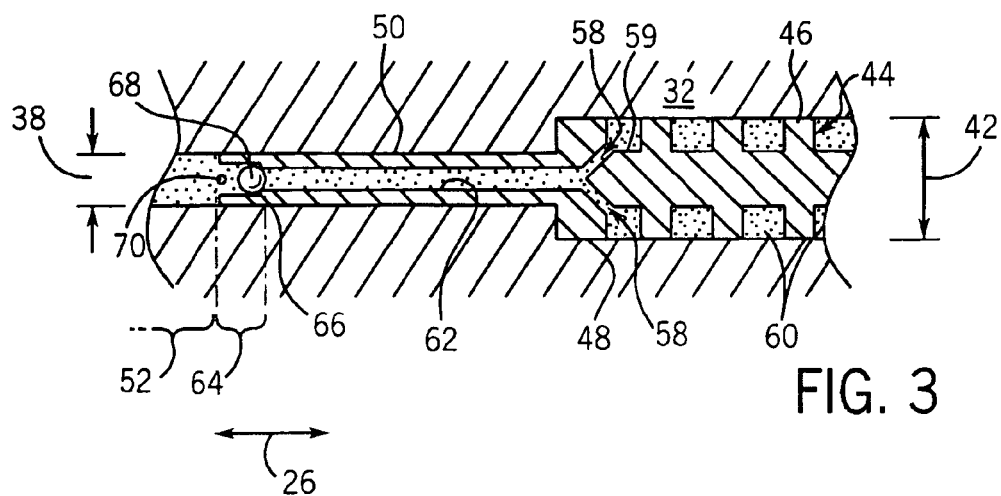

INJECTOR WITH IMPROVED SMALL SHOT METERING

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates generally to injection molding, and more particularly, to an injection screw and barrel providing improved control of small shots of plastic during injection molding.

The injection molding process employs an injector that forces a volume of thermoplastic material (a "shot") under pressure into a mold cavity. A common injector design provides an outer barrel holding an injection screw. Pellets of thermoplastic resin from a hopper fall enter the barrel at a feed zone and they are received by threads ("flights") on the injection screw. The injection screw rotates within the barrel to shear, blend, and advances the molten plastic toward the front of the barrel near a nozzle that communicates with the mold cavity.

As molten plastic is advanced toward the front of the barrel, the injection screw retracts, allowing molten plastic to fill a metering zone just behind the nozzle. At the time of the injection, the injection screw is moved like a piston to push the plastic from the metering zone into the nozzle and ultimately into the mold.

In order to obtain consistent and high quality molded parts, the movement of the screw within the barrel must be accurately controlled. This is difficult for small shot sizes where very little screw movement occurs. For this reason for small shots of plastic, it is desirable to reduce the diameter of the bore of the injector barrel and the diameter of the injection screw so as to provide the largest possible amount of screw travel for the small shot volume.

Small injection screws are difficult to manufacture and there are practical limits on injection screw diameter resulting from the need for thread depth and sufficient root diameter to withstand the torque and compression placed on the injection screw.

BRIEF SUMMARY OF THE INVENTION

The present invention provides an injector using an injection screw having a plunger portion of reduced diameter. This reduced diameter increases screw movement for a given shot size allowing more precise injection control. The plunger is thread-less, so molten plastic reaches the metering zone through a hollow channel in the plunger rather than around the threads as in a conventional injection molding system. By separating the metering function of the injection screw (in the plunger portion of the screw) from the shearing, mixing and plastic advancing functions of the injection screw (in the threaded portion of the screw), greater flexibility may be had in designing injectors for small shots.

Specifically, the present invention provides an injection screw for injection molding having: (1) a flight section supporting outwardly extending threads where the threads have an outer diameter and, (2) a plunger section continuing from an end of the flight section and having a central bore opening at a nozzle end of the injection screw. The plunger section has an outer diameter smaller than the diameter of the threads of the flight section and at least one passage communicates from the flight section to the bore of the plunger section.

It is thus one object of the invention to provide an extremely small diameter metering zone so as to improve the accuracy of the injection process. The problem of manufacturing small diameter threaded injection screws is avoided by eliminating threads on the plunger and using a hollow channel for plastic transport.

The injection screw may include a plug between the flight section and the plunger section, the plug having an outer diameter substantially equal to the inner diameter of the barrel and the passage may communicate through the plug between the flight section and the plunger section.

It is thus another object of the invention to provide a simple method of directing molten plastic from the flight section of the injection screw into the bore of the plunger. The plug may ride in the larger diameter portion of the bore, generally a cylinder sized to equal the outer diameter of the threads, providing a simple seal between the flight section and the plunger section.

The plunger section of the injection screw may include a check valve blocking the flow of melt backwards toward the flight section.

Thus it is another object of the invention to provide an anti-backup valve suitable for use with the present screw design.

The check valve may be a ball contained in the bore opposite a seat formed by the bore.

Thus it is another object of the invention to provide an extremely simple check valve structure.

The plunger section may have a substantially cylindrical outer wall of constant diameter.

It is therefore another object of the invention to provide a simple plunger shape that is easy to machine and seal.

The passage between the plunger section and the flight section may be a hole leading from a root of a thread at an end of the flight section near the plunger section.

Thus it is another object of the invention to provide a simple method of establishing a passage between the flight section and the plunger section that does not affect the clearance between the threads in the flight section and the barrel.

These particular objects and advantages may apply to only some embodiments falling within the claims and thus do not define the scope of the invention.

BRIEF DESCRIPTION OF THE DRAWINGS

FIG. 1 is a perspective, cutaway view of a prior art injector showing the metering zone as defined by the outer diameter of the threads of the injection screw.

FIG. 2 is a side-elevation, partial cross-sectional view of a barrel of the present invention holding a two-part injection screw having a plunger and flight section separated by a plug, the injection screw not in cross-section; and FIG. 3 is an enlarged view of FIG. 2 with the injection screw also in cross-section showing the internal passageways in the injection screw from the flight section to the plunger section via a bore within the plunger section.

DETAILED DESCRIPTION OF THE PREFERRED EMBODIMENT

Referring to FIG. 1, a prior art injector 10 includes a nozzle 12 such as may abut a mold (not shown) during the injection process. The nozzle 12 screws into a generally cylindrical barrel 14 having an inner cylindrical chamber 16. A diameter 18 of the chamber 16 approximates the outer diameter of the threads 20 of an injection screw 22 positioned behind the nozzle 12.

During operation, the injection screw 22 is actuated for rotary motion 24 to fill a metering zone 28 with molten plastic prior to an injection. As the plastic fills the metering zone 28, the injection screw is actuated for longitudinal motion 26 to retract from the metering zone 28 to be displaced by melt.

When a sufficient shot is collected in the metering zone, the injection screw is again actuated for longitudinal motion, this time to extend into the metering zone 28 forcing the melt from the nozzle 12. The amount of longitudinal motion 26 necessary for injection of the shot held in the metering zone 28 will be inversely proportional to the diameter 18 of the chamber 16. Accordingly, for good control of the injection process, the diameter 18 of the chamber 16 should be reduced so as to provide an amount of longitudinal motion 26 comparable with that provided in larger shots.

Referring now to FIG. 2, the injector 30 of the present invention also provides a nozzle 12 attached to the front end of a barrel 32. The barrel 32, however, has a stepped chamber 31 defining a metering zone 34 near the nozzle 12, and a mixing zone 36 behind the metering zone 34 with respect to the nozzle 12, each of different diameters. The diameter 38 of the metering zone 34 is generally larger than the diameter 40 of the opening in the nozzle 12, but smaller than the diameter 42 of the mixing zone 36.

An injection screw 44 for the barrel 32 provides two sections corresponding generally to the mixing zone 36 and metering zone 34, respectively. Specifically, the injection screw 44 provides a flight section 46 leading to a plunger section 50 closest to the nozzle 12.

The flight section 46 of the injection screw 44 includes double helix threads 54 having an outer diameter (measured at the crest of the threads 54) substantially equal to the inner diameter 42 of the mixing zone 36. A root diameter (measured at the root of the threads 54) is, in a preferred embodiment, substantially equal to the outer diameter of the plunger section 50 as will now be described.

Generally, the plunger section 50 has a cylindrical outer surface substantially equal to the inner diameter 38 of the metering zone 34 to fit like a piston smoothly within the cylindrical chamber of the metering zone. The longitudinal position of the plunger section 50 within the metering zone 34 defines the melt zone 52 in which melt will accumulate prior to injection.

In the preferred embodiment, the plug section 48 separates the plunger section 50 from the flight section 46. The plug section 48 has a cylindrical outer surface substantially equal to the inner diameter 42 of the mixing zone 36 to seal against the cylindrical chamber of the mixing zone 36 preventing plastic flow around its outer edges.

The end of the injection screw 44 removed from the nozzle 12 may include a square drive coupling 45 of a type well known in the art. The drive coupling allows the screw to be attached to the mechanism providing for its rotation, and translation of the injection screw 44 according to methods well known in the art.

Referring now to FIGS. 2 and 3 during operation of the injector 30, melt 60 (shown in FIG. 3) will be sheared, blended and advanced by the threads 54 of the flight section 46 toward the plunger section 50, but will not be able to pass around the outer edges of the plug section 48 because of its tight clearance with the inner surface of the chamber of the mixing zone 36. Nevertheless, plastic material in the mixing zone 36 will be able to pass into holes 58 (only one shown in FIG. 2) leading from the thread roots 59, at the opposite sides of the injection screw 44 near the plug section 48.

The holes 58 conduct the melt 60 from the thread roots 59 of the flight section 46 to a bore 62 extending axially through the center of the plunger section 50. The bore 62 leads to the melt zone 52 where the melt 60 can collect as the injection screw 44 is withdrawn.

The end of the bore 62 at the end of the plunger section 50, prior to exiting the plunger section 50, is enlarged to provide a valve body 64 having a valve seat 66 formed by a radially extending wall between the valve body and the bore 62. A check valve ball 68 is held in the valve body 64 by a transverse pin 70. The check valve ball 68 may move forward under the flow of melt 60 to hit the transverse pin and to be retained within the valve body while providing sufficient clearance to allow the melt 60 to pass out of the bore 62. When the injection screw 44 is advanced, however, the check valve ball 68 is moved backward against the seat 66 sealing against the seat 66 to prevent backward flow of the melt 60 toward the flight section 46. In this way, the advancing plunger section 50 can act like a piston to force melt 60 from the nozzle 12 into a mold.

By reducing the diameter 38 of the metering zone 34, greater longitudinal motion 26 accompanies the injection of the shot. For a given linear precision of the actuator (not shown) driving the injection screw 44 in longitudinal motion 26, a greater volume precision in the amount of melt 60 injected is obtained. The strength of the injection screw 44 is not adversely affected because the plunger section 50 need not be significantly reduced in strength from the flight section 46 which has a substantially equal root diameter. Generally there will be little or no torsion on the plunger section 50 which has no threads, so a further reduction in the diameter 38 of the plunger section 50 may easily be obtained.

It is specifically intended that the present invention not be limited to the embodiments and illustrations contained herein, but include modified forms of those embodiments including portions of the embodiments and combinations of elements of different embodiments as come within the scope of the following claims.

We claim:

1. An injector for injection molding comprising:
    an injection screw having:
        (i) a flight section supporting outwardly extending threads, the threads having an outer diameter; and
        (ii) a plunger section extending from an end of the flight section and having a central bore opening at a nozzle end of the injection screw, the plunger section having an outer diameter smaller than the outer diameter of the threads of the flight section;
    an injector barrel having:
        (i) a metering section with an inner diameter substantially equal to the outer diameter of the plunger section of the injection screw so that the plunger section fits like a piston within the metering section; and
        (ii) at least one passage communicating from the flight section to the bore of the plunger section.

2. The injector of claim 1 further including a plug between the flight section and the plunger section, the plug having an outer diameter substantially equal to the outer diameter of the threads of the flight section, wherein the passage communicates through the plug between the flight section and the plunger section.

3. The injector of claim 1 wherein the plunger section includes a check valve blocking flow of melt through the bore toward the flight section.

4. The injector of claim 3 wherein the check valve is a ball contained in the bore opposite a seat.

5. The injector of claim 1 wherein the plunger section has a substantially cylindrical outer wall of constant diameter.

6. The injector of claim 1 wherein one end of the passage is positioned within a root of a thread in the flight section at an end of the root near to the plunger section.

7. The injector of claim 1 wherein the flight section has a double helix thread and wherein two passages lead from each of the roots of the double helix thread at ends of the roots closest to the plunger section.

8. The injector of claim 1 wherein the outer diameter of the plunger section is a diameter substantially equal to a root diameter of the threads of the flight section.

9. The injector of claim 1 further including a drive coupling attached to an end of the injection screw opposite the plunger section.

10. An injector for injection molding comprising:
 an injection screw having:
  (i) a flight section supporting outwardly extending threads, the threads having an outer diameter;
  (ii) a plunger section extending from an end of the flight section and having a central bore opening at a nozzle end of the injection screw, the plunger section having an outer diameter smaller than the outer diameter of the threads of the flight section; and
  (iii) at least one passage communicating from the flight section to the bore of the plunger section; and
 an injector barrel having:
  (i) a metering section with an inner diameter substantially equal to the outer diameter of the plunger section of the injection screw so that the plunger section fits like a piston within the metering section;
  (ii) a mixing section having an inner diameter substantially equal to the outer diameter of the threads of the flight section of the injection screw.

11. The injector of claim 10 wherein the nozzle end includes a nozzle opening with an inner diameter smaller than the inner diameter of the metering section.

12. The injector of claim 10 wherein the plunger section includes a check valve blocking flow of melt through the bore toward the flight section.

13. The injector of claim 10 wherein the injection screw further includes a plug between the flight section and the plunger section, the plug having an outer diameter substantially equal to the inner diameter of the mixing section of the injector bore, wherein the passage communicates through the plug between the flight section and the plunger section.

14. The injection screw of claim 10 wherein the plunger section of the injection screw has a substantially cylindrical outer wall of constant diameter matching a substantially cylindrical inner wall of the metering section of the injector barrel.

15. An injector barrel for use with an injection screw having a flight section supporting outwardly extending threads, the threads having an outer diameter; a plunger section extending from an end of the flight section and having a central bore opening at a nozzle end of the injection screw, the plunger section having an outer diameter smaller than the outer diameter of the threads of the flight section; and at least one passage communicating from the flight section to the bore of the plunger section, the injector barrel comprising:
 (i) a metering section with an inner diameter substantially equal to the outer diameter of the plunger section of the injection screw so that the plunger section fits like a piston within the metering section; and
 (ii) a mixing section having an inner diameter substantially equal to the outer diameter of the threads of the flight section of the injection screw and larger than the outer diameter of the metering section.

\* \* \* \* \*